United States Patent [19]
Lux

[11] Patent Number: 5,274,430
[45] Date of Patent: Dec. 28, 1993

[54] PROCESS AND A SYSTEM FOR TAKING DISTANCE IMAGES

[75] Inventor: Peter Lux, Langenargen, Fed. Rep. of Germany

[73] Assignee: Dornier Luftfahrt GmbH, Fed. Rep. of Germany

[21] Appl. No.: 942,234

[22] Filed: Sep. 9, 1992

[30] Foreign Application Priority Data

Sep. 9, 1991 [DE] Fed. Rep. of Germany ....... 4129912

[51] Int. Cl.$^5$ .................... G01C 3/00; G01C 5/00
[52] U.S. Cl. ............................ 356/5; 358/107
[58] Field of Search ............................ 356/5; 358/107

[56] References Cited

U.S. PATENT DOCUMENTS

| 3,649,124 | 3/1972 | Takaoka et al. | 356/5 |
| 3,899,250 | 8/1975 | Bamberg et al. | 356/5 |
| 4,199,253 | 4/1989 | Ross | 356/5 |
| 4,518,256 | 5/1985 | Schwartz | 356/5 |
| 4,920,412 | 4/1990 | Gerdt et al. | 356/5 |

FOREIGN PATENT DOCUMENTS 3404396 4/1989 Fed. Rep. of Germany.

*Primary Examiner*—Stephen C. Buczinski
*Attorney, Agent, or Firm*—Evenson, McKeown, Edwards & Lenahan

[57] ABSTRACT

A process for generating distance images operates by the emission of light pulses and the synchronized time-delayed reception of the reflected light pulses on an image receiving unit with a shutter device connected in front of it. During the reception of a reflected light pulse, the transparency of the shutter device passes through a given time-dependent function and in this manner at least two such modulated reflection images are generated while different transparency functions are used. A color is assigned to each of these images, and the colored images are superimposed to form a false-color-coded distance image.

17 Claims, 2 Drawing Sheets

PROCESS AND A SYSTEM FOR TAKING DISTANCE IMAGES

BACKGROUND AND SUMMARY OF THE INVENTION

The present invention relates to a process and a system for taking distance images.

A "distance image" is the representation of an object whose image points do not, as in the case of a normal picture, correspond to the brightnesses or colors of the object points but rather to the respective distances of the corresponding object points.

Processes are known for the two-dimensional measuring of distance information in the form of a distance image (P. Levi, *Elektronik* 12, 1983, Pages 93-98). The known processes may be divided into two groups which differ as a result of the physical measuring principle. The first group involves measuring the transit time of electromagnetic or acoustic waves and the second group involves triangulation processes. The first principle is suitable for measuring ranges extending from one meter to infinite and produces measuring accuracies of $\geq 1$ mm; the second principle is used on the basis of the connection between the measuring basis and the measuring accuracy mainly in the close range of $\leq 1$ m.

It is a disadvantage of the known systems which include the measuring of the transit time that generally in each case the distance from a measuring point to the sensor is measured. An image is generated by beam deflection; for example, by means of rotating or oscillating mirrors. A system of this type requires high mechanical and optical expenditures and is correspondingly expensive.

Systems which operate according to the triangulation principle, under certain conditions, permit a simultaneous measuring of several distance image points. However, it is disadvantageous that the data may be ambiguous, that the image evaluation will then require high expenditures, and that the measuring range is limited to close distances.

An arrangement for taking distance images according to the system of transit time measuring is known on the basis of U.S. Patent No. 4,199,253. In this case, short light pulses are emitted by a laser and the light reflected by the object is collected. The overall image is established from the different transit times. The computing expenditures for the evaluation are relatively large.

In the German Patent Document DE-PS 34 04 396, a process is described in which individual distance ranges are imaged by means of a pulsed laser and a synchronously controlled electronic shutter (image intensifier element) and, after an intermediate storage, may be composed into a distance image. It is a disadvantage of this process that, for producing a distance image, several individual images must be generated, stored intermediately and processed until they form a distance image.

There is therefore needed a process by means of which distance images can be generated rapidly and with as few evaluation expenditures as possible.

According to the invention, these needs are met by a process for generating distance images according to the principle of emitting a light pulse and the synchronized time-delayed reception of the reflected light pulse on an image receiving unit. The image receiving unit includes a shutter device connected in front of the image receiving unit. During the reception of a reflected light pulse, the transparency of the shutter device passes through a given, time-dependent, essentially continuous function. In this manner, at least two such modulated reflection images respectively of the distance range to be imaged are generated but with the use of different transparency functions. A color is assigned to each of these modulated reflection images and the colored modulated reflection images are superimposed to form a false-color-coded image so that the distance of an imaged object is represented by a color value and its reflectivity is represented by a brightness value. Arrangements for carrying out this process are also described.

When the process according to the invention is used, a distance image can be generated by means of nothing more than an emitted light pulse and correspondingly synchronously controlled electronic shutters. The finished image contains the distance of the object as a color value in false-color coding and, in addition, its reflectivity as a gray-scale value so that the contrast of the object is contained in the image information. The image therefore represents a distance image as well as a reflectivity image.

The reflected energy of the emitted light pulses is imaged in a synchronized and time-delayed manner on an image receiving unit, also called a video target. A shutter, which is preferably electronic and the transparency of which is controlled corresponding to a desired time function (transparency function), is connected in front of the image receiving unit. A reflection image of the imaging area is obtained, in which case the gray-scale values of the individual image points are, on the one hand, the result of the reflectivity of the imaged objects and, on the other hand, the result of the time sequence of the transparency function. At least two of such time-modulated reflection images are required, in which case they are each generated using various transparency functions. These reflection images may be generated in parallel with respect to time, in which case only one light pulse is emitted but correspondingly there are several receiving devices (shutter and image receiving unit). However, a sequential production is also possible while several light pulses are emitted, in which case only one receiving arrangement will then be required.

In the next process step, the generating of the actual distance image will take place from the superposition of the individual time-modulated reflection images. For this purpose, a color is assigned to the image information (gray-scale values of the individual image points) of one of the modulated reflected images respectively (coloring of the images). The superimposing of these images results in a color image, in which case the color values of the individual image points resulting from the superposition contain the distance information.

The shutter with the time-variable transparency, which is used for carrying out the process and which is connected in front of an image receiving unit, is preferably implemented electronically in the form of a rapidly switchable image intensifier (channel plates), the intensifying factor of which is controllable according to the desired time-variable transparency.

A laser is advantageously used as the light source, and a charge coupled device (CCD), a vidicon and a charge injection arrangement (CID) are preferably used as the image receiving unit.

By means of the process according to the invention, it is possible to take distance images with a high local definition, according to the television standard (50 or 60 images/s), and to show that a broad variety of applications of operating systems up to 3-d television are obtained for such an apparatus.

Other objects, advantages and novel features of the present invention will become apparent from the following detailed description of the invention when considered in conjunction with the accompanying drawings.

DETAILED DESCRIPTION OF THE DRAWINGS

Figure 1:
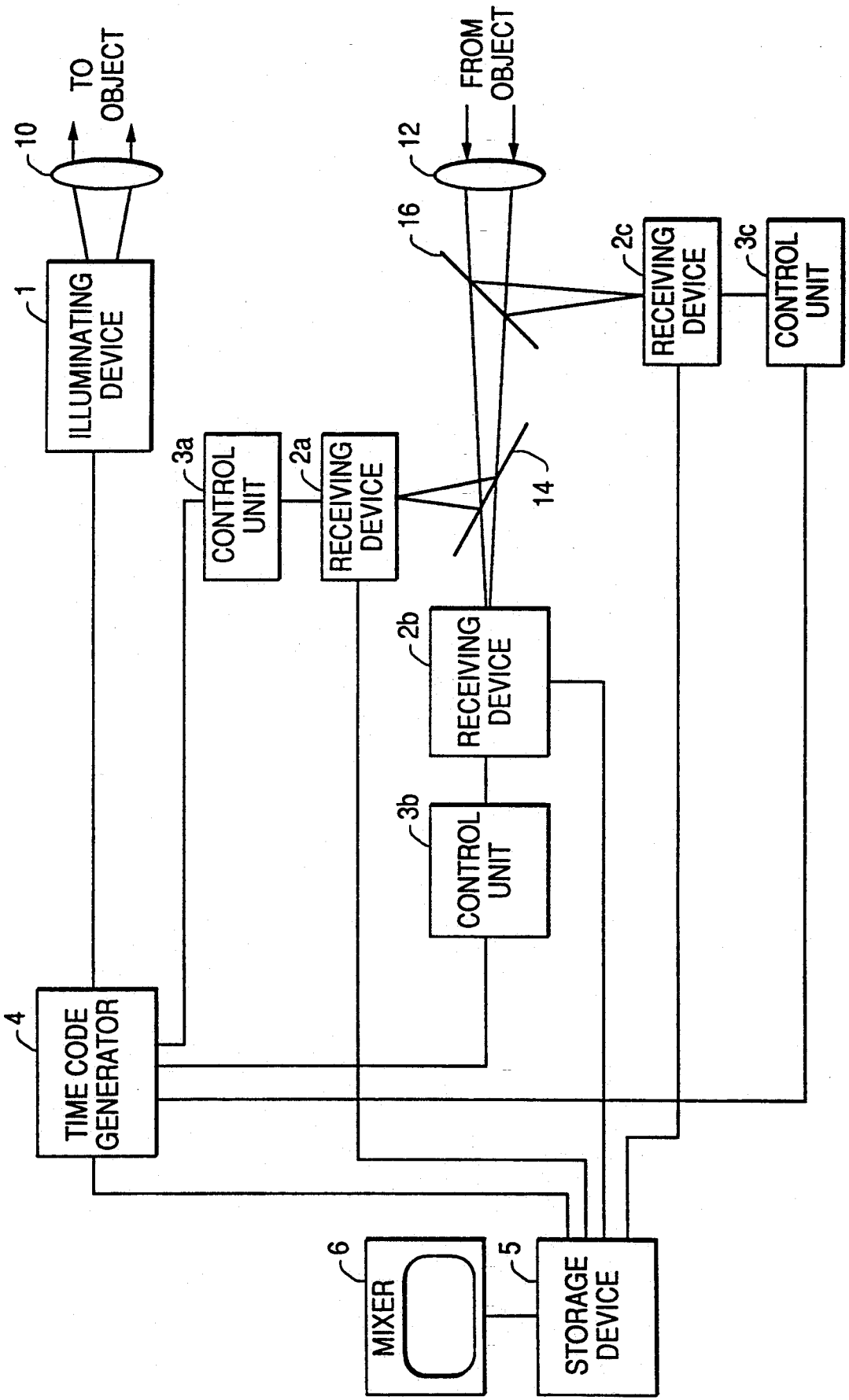
FIG. 1 is a block diagram of an arrangement by means of which the process according to the invention can be carried out.

FIG. 1 is the block diagram of an arrangement according to the present invention having three receiving devices 2a, 2b, 2c (for example, low-light-level cameras), by means of which three modulated reflection images are generated simultaneously.

An illuminating device 1, preferably a laser, controlled by the time code generator 4, at a certain point in time $t_1$ (see FIG. 2) emits a light pulse. The light pulse is reflected by the object to be imaged, by way of an optical beam splitting system, for example, comprising several partially transmitting mirrors 14, 16 and is guided to the receiving devices 2a, 2b, 2c. In order to achieve a uniform distribution to the three receiving devices, the first beam splitter 16, in this case, is designed such that approximately ⅓ of the incident light is reflected; ⅔ are transmitted, while the beam splitter 14 which follows is a semi-transmitting mirror.

Corresponding to the distance range to be imaged, at a later point in time $t_2$ to a point in time $t_3$ (opening and closing of the shutters), the image intensifiers, having an integrated image receiving unit (preferably a CCD-receiving matrix) within the receiving devices 2a, 2b, 2c, are controlled by the control units 3a, 3b, 3c. They are controlled specifically in such a manner that their intensification is changed by freely programmable time-dependent functions (transparency functions), for example, according to those shown in FIG. 2, starting from zero. After the point in time $t_3$, the reflection images of the area to be imaged, which are modulated in this manner, are present in the image receiving units of the cameras 2a, 2b, 2c. A mixer stage 6 (such as a video composer) synchronizes the read-out operation of the image receiving units as a function of the given signals of the time code generator 4, assigns to each of the three channels a color value, such as the three primary colors red, yellow, blue, and mixes these colored images so that a color image is formed from the resulting mixed colors. The additional unit 5 contains an image point storage device so that a digital image processing interface is made possible.

Figure 2:
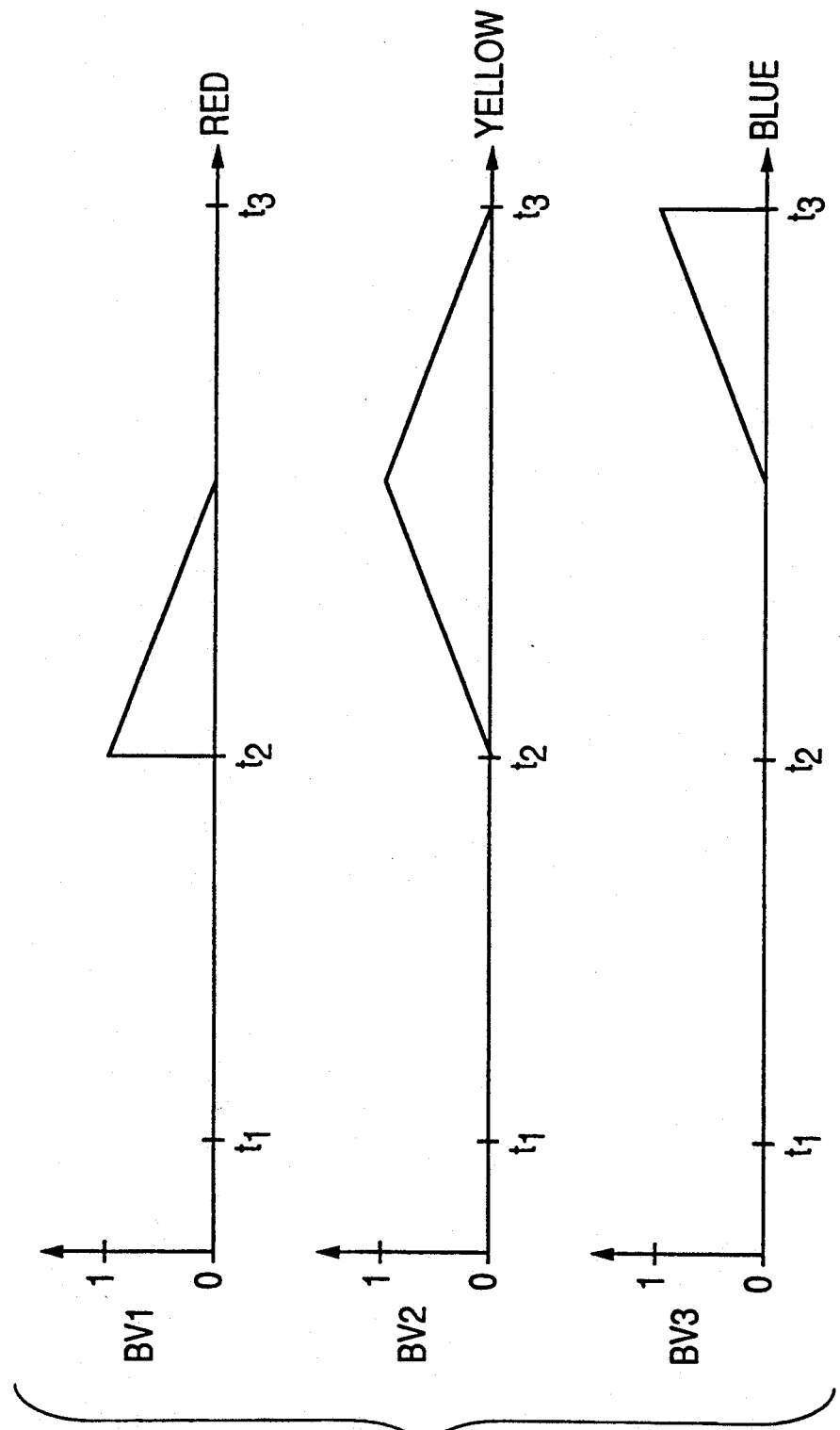
FIG. 2 is an example of the time sequence of three transparency functions.

The process will now be explained by means of a concrete example. For this purpose, FIG. 2 illustrates, as examples, the time sequences of the intensifying factors standardized to one on the three image intensifiers BV1, BV2, BV3 (transparency functions). In this case, a zero intensification means that no reflected energy can arrive at the subsequent image receiving unit. One of the primary colors red, yellow or blue is assigned to each of the three image intensifiers.

An area at a depth of 50 m is to be imaged, starting at a distance of 50 m from the sensor. Three objects are situated in the area, for example, three trees at a distance of approximately 50–55 m, 75–80 m, and 95–100 m.

At the time $t_1 = 0$, a light pulse is emitted. In order to adjust to the area to be imaged, the point in time $t_2$, from which the intensifying factors are increased starting from zero (opening of the shutters), must be dimensioned such that $t_2$ corresponds to twice the transit time of the light signal from the sensor to the next point of the area to be imaged. The point in time $t_3$, starting from which all intensifying factors are again equal to zero (closing of the shutters), must be dimensioned such that it corresponds to twice the transit time of the light pulse from the sensor to the most remote point of the area to be imaged. In one nanosecond, the light pulse travels 0.30 m so that $t_2$ corresponds to approximately 333 nsec, and $t_3$ corresponds to approximately 667 nsec. The light meeting the first tree therefore reaches the receiver after 333 to 367 nsec. At this time, the intensification of the red channel is approximately 1; that of the yellow and blue channel is approximately zero respectively. The image of the tree is imaged in red/orange in the superposed image. In the case of the second object at a distance of approximately 75 m, whose reflection signal is received at the point in time $(t_3-t_2)/2$, the color yellow is predominant, and in the case of the most remote object (received at the point in time $t_3$), the color blue is predominant. Objects which are situated between these three objects used as examples are represented by corresponding secondary colors.

The time-dependent intensifying factors of the individual channels are advantageously selected such that the sum of the individual intensifications at any point in time t within the exposure time $\Delta t = t_3 - t_2$ has the same value. Thus, it is achieved that the brightness of the reflected signals have a constant sum so that a superposed image is created whose color corresponds to the distance and which contains the contrast of the setting as a gray-scale value. As alternatives to the functions illustrated in FIG. 2, different functions which meet this condition may also be used.

The transparency functions run essentially continuously, which means that the transparency functions change continuously right down to a possible but finite number of non-sequential changes. In this case, all values between 0 and 1 may be assumed; that is, between complete non-transparency and complete transparency. As a rule, at any point in time t within the shutter opening time with $t_2 < t < t_3$ at least two of the transparency functions will have an intermediate value of between 0 and 1. This does not exclude that, as, for example, in FIG. 2, at $t_2$, $(t_3-t_2)/2$ and $t_3$ at individual points in time, there may in each case be only one pure color. It is important that, at any point in time, a different combination of momentary values of the transparency functions is present in order to obtain an unambiguous assignment between the distance and the color value. Discontinuous changes occur, for example, during the opening of the shutters (point in time $t_2$) when the values of the transparency functions are set from zero to their respective starting value, and correspondingly during the closing of the shutters (point in time $t_3$) when the transparency functions are set back from their final value to zero.

Advantageously, the sum of the momentary values of the transparency functions may be selected to be proportional to $1/R^2$, wherein R is the mean distance of the area to be imaged from the camera. As a result, differences in brightness can be compensated which result from the distance-dependent light intensity in the case of the lighting.

In order to increase the sensitivity, multiple lighting of the image receiving units is possible. The lighting source as well as the image intensifiers may be designed such that, even in the case of an exposure time $\Delta t = t_3 - t_2$ of 1/30 and 1/25 sec., several thousand individual exposures may be carried out.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for generating distance images operating via a synchronized time-delayed reception on an image receiving unit of a reflected light pulse emitted from a source, said image receiving unit including a shutter device coupled in front of the image receiving unit, the process comprising the steps of:

during the reception of a reflected light pulse, operating the shutter device such that its transparency passes through a given, time-dependent, substantially continuous function to provide modulated reflection images, wherein in this manner at least two such modulated reflection images of an entire distance area to be imaged are generated using different transparency functions;

assigning a color to each of said at least two modulated reflection images to provide colored modulated reflection images; and superimposing said colored modulated reflection images to form a false-color-coded image wherein the distance of an imaged object is represented by a color value and its reflectivity is represented by a brightness value.

2. A process according to claim 1, wherein the modulated reflection images are generated in parallel with respect to time while only one light pulse is emitted.

3. A process according to claim 1, wherein the modulated reflection images are generated sequentially while emitting several light pulses.

4. A process according to claim 1, wherein a sum of the transparency functions is independent of time.

5. A process according to claim 2, wherein a sum of the transparency functions is independent of time.

6. A process according to claim 3, wherein a sum of the transparency functions is independent of time.

7. A process according to claim 1, wherein a factor of $1/R^2$ multiplicatively superimposed on the transparency functions, wherein R is the median distance of the object.

8. A process according to claim 2, wherein a factor of $1/R^2$ is multiplicatively superimposed on the transparency functions, wherein R is the median distance of the object.

9. A process according to claim 3, wherein a factor of $1/R^2$ is multiplicatively superimposed on the transparency functions, wherein R is the median distance of the object.

10. A process according to claim 4, wherein a factor of $1/R^2$ is multiplicatively superimposed on the transparency functions, wherein R is the median distance of the object.

11. A process according to claim 1, wherein, for improving the signal-to-noise ratio, several modulated reflection images taken with the same transparency function are superimposed on the same image receiving unit.

12. A process according to claim 2, wherein, for improving the signal-to-noise ratio, several modulated reflection images taken with the same transparency function are superimposed on the same image receiving unit.

13. A process according to claim 3, wherein, for improving the signal-to-noise ratio, several modulated reflection images taken with the same transparency function are superimposed on the same image receiving unit.

14. A process according to claim 4, wherein, for improving the signal-to-noise ratio, several modulated reflection images taken with the same transparency function are superimposed on the same image receiving unit.

15. A process according to claim 7, wherein, for improving the signal-to-noise ratio, several modulated reflection images taken with the same transparency function are superimposed on the same image receiving unit.

16. An arrangement for generating distance images of a distance area, comprising:

a device for emitting light pulses onto an object to be imaged;

a plurality of receiving devices for receiving a reflected light pulse from said object, each of said receiving devices including one image receiving unit and one image intensifier, said image intensifier is connected in front of said image receiving unit and operating as a shutter device having a transparency passing through a given, time-dependent, substantially continuous function to provide modulated reflection images of the entire distance area, wherein the time-dependent intensifying of each of said receiving devices is controlled by a control unit according to the given, time-dependent, substantially continuous function;

a time code generator which synchronizes the intensifying of the image intensifiers with the emitting of the light pulses; and a mixer stage which assigns a color to the image content of each image receiving unit and superimposes it to form a false-color coded image.

17. An arrangement for generating distance images of a distance area, comprising:

a device for emitting light pulses onto an object to be imaged;

a plurality of receiving devices for receiving a reflected light pulse from said object, each of said receiving devices including an image receiving unit and an image intensifier, said image intensifier is connected in front of said image receiving unit and operating as a shutter device having a transparency passing through a given, time-dependent, substantially continuous function to provide modulated reflection images of the entire distance area, wherein the intensifying of each of said receiving devices is controlled by a control unit according to the given, time-dependent, substantially continuous function;

a time code generator which synchronizes the intensifying of the image intensifiers with the emitting of the light pulses;

an image storing unit in which the image content of several image receiving units is stored intermediately; and a mixer stage which assigns one color respectively to the stored image contents of the image receiving units and superimposes it to form a false-color coded image.

* * * * *